March 29, 1960 J. D. BLOOM 2,930,430

MULTIPLE TILT CHAIR, CHAISE LOUNGE OR HAMMOCK

Filed Dec. 11, 1956 5 Sheets-Sheet 1

INVENTOR.
Judith D. Bloom,
BY Brown, Jackson,
Boettcher & Dienner
Attys.

MULTIPLE TILT CHAIR, CHAISE LOUNGE OR HAMMOCK

Filed Dec. 11, 1956 5 Sheets-Sheet 2

INVENTOR.
Judith D. Bloom,
BY Brown, Jackson,
Boettcher & Dienner
Attys

MULTIPLE TILT CHAIR, CHAISE LOUNGE OR HAMMOCK

INVENTOR.
Judith D. Bloom,
BY Brown, Jackson,
Boettcher & Dienner
attys

March 29, 1960 J. D. BLOOM 2,930,430

MULTIPLE TILT CHAIR, CHAISE LOUNGE OR HAMMOCK

Filed Dec. 11, 1956 5 Sheets-Sheet 4

INVENTOR.
Judith D. Bloom,
BY Brown, Jackson, Boettcher & Dienner
attys

March 29, 1960 J. D. BLOOM 2,930,430

MULTIPLE TILT CHAIR, CHAISE LOUNGE OR HAMMOCK

Filed Dec. 11, 1956 5 Sheets-Sheet 5

INVENTOR.
Judith D. Bloom,
BY Brown, Jackson, Boettcher & Dienner
Attys.

United States Patent Office 2,930,430
Patented Mar. 29, 1960

2,930,430

MULTIPLE TILT CHAIR, CHAISE LOUNGE OR HAMMOCK

Judith D. Bloom, Chicago, Ill., assignor of one-fourth to William E. Martin, Kewanee, Ill.

Application December 11, 1956, Serial No. 627,633
12 Claims. (Cl. 155—77)

The present invention relates to a multiple tilt chair, chaise lounge or hammock.

The general object of the invention is to provide an improved seating or reclining device in the nature of the chair, chaise lounge or hammock which can be made to occupy any desired one of a plurality of different tilted positions by the user or occupant merely changing the position of his body in the device. The position of the body may be reversed end for end or placed cross-wise at different angles in the device.

The device comprises a centrally depressed pocket of substantially conical shape serving as the seating or reclining surface of the device. This substantially conical pocket is generally of circular outline, as viewed in plan, although in the chaise lounge embodiment of my invention it is slightly elongated into oval outline. However, either in the chair or the chaise lounge embodiment, the depressed pocket might be rectangular, octagonal or of any irregular shape. Extending entirely around the upper edge of this depressed conical pocket is a continuous rim, which is also circular or oval in outline to conform to the shape of the depressed pocket. The occupant can sit or lie down with his body extending at different selected angles cross-wise or length-wise of the depressed pocket, and with his legs or feet extending outwardly over the continuous rim at different points around the device.

Below the depressed pocket is a multiple tilt base structure which has an outline corresponding substantially to the circular or oval outline of the depressed pocket and surrounding rim. This multiple tilt base structure can be made to assume different tilted positions, depending upon the side from which the occupant places his body in the depressed pocket. Such base structure is in the form of an inverted obtuse pyramid having a downwardly projecting apex located substantially centrally of the base structure. Radiating outwardly at different angles from this downwardly projecting apex are triangularly shaped resting or supporting surfaces, onto any one of which the device may be tilted for resting support. In the preferred embodiments of my invention, there are four of such resting surfaces, so that the device can be tilted into four different positions, but it will be understood that the device may have a greater or lesser number of resting surfaces.

Another object or feature of the invention is the provision of such a device which cannot be accidentally tipped over backwards. This makes the device safe to use under any circumstances.

Other objects, features and advantages of the invention will appear from the following detailed description of different preferred embodiments of the invention. In the accompanying drawings illustrating such embodiments:

Figures 16 to 19 inclusive are vertical sectional views of another modified embodiment of chair, wherein the seat unit and the base structure are both molded of a plastic material, these figures showing four different angles of tilt of the chair.

Figures 16, 17, 18, 19, 20:
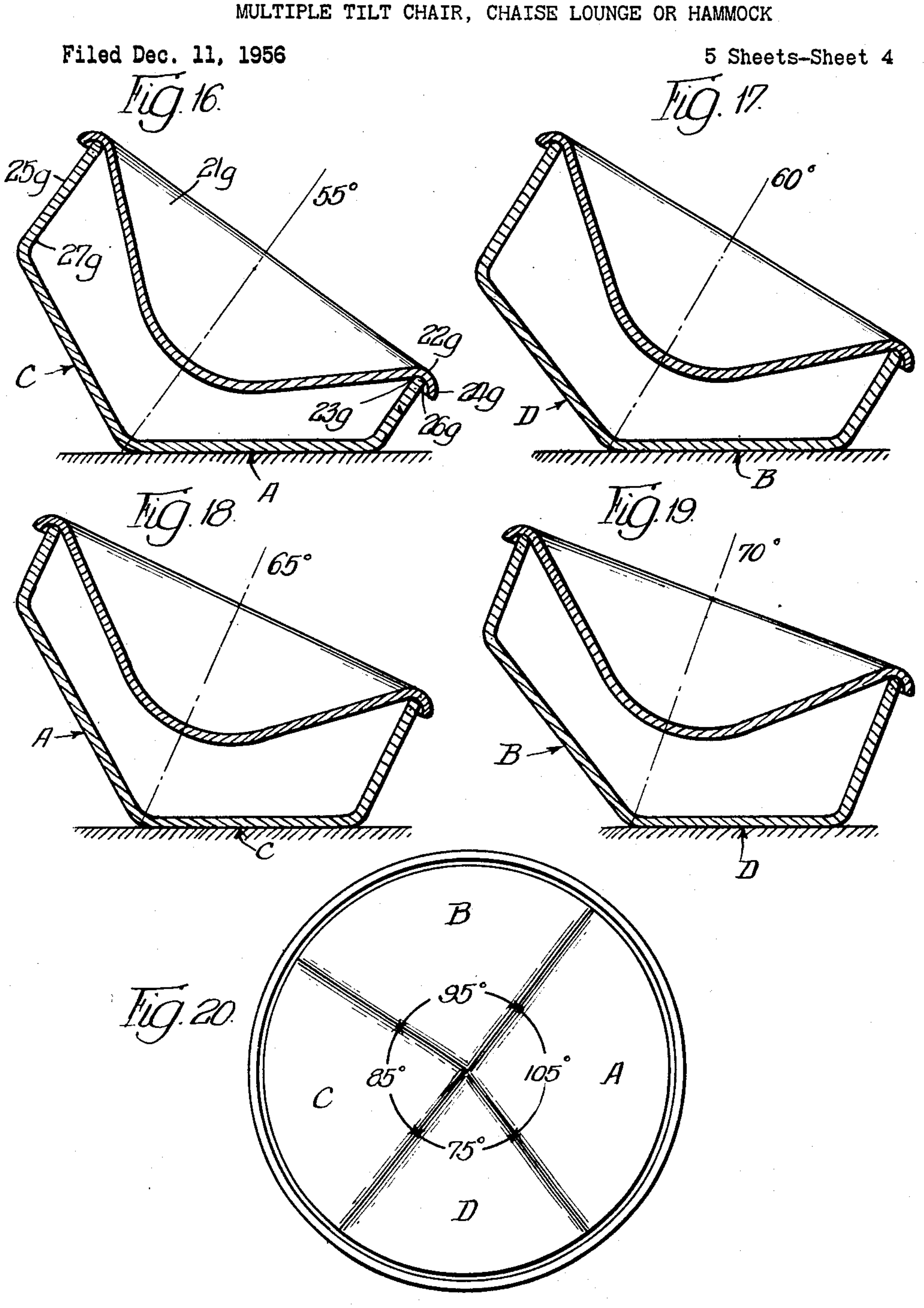

Figure 20 is a bottom elevational view of this modified base structure, showing the four supporting surfaces for securing the four different angles of tilt of the chair.

Figure 21:
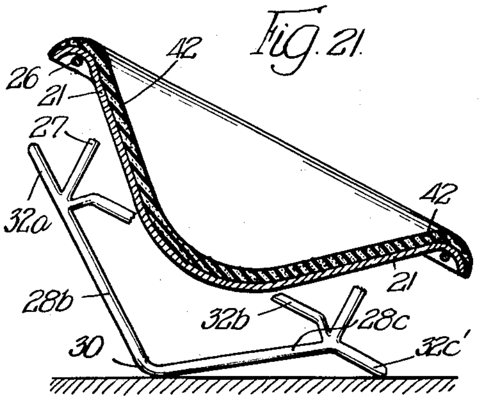
Figure 22:
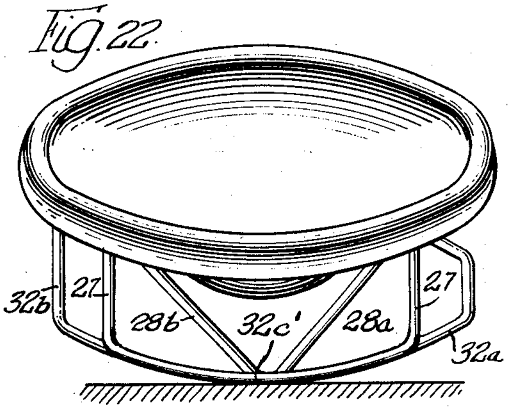

Figure 21 is a fragmentary side sectional view and Figure 22 is a front view of still another modified embodiment adapted to accommodate sidewise rocking movement when the chair is inclined at one angle.

Figure 23:
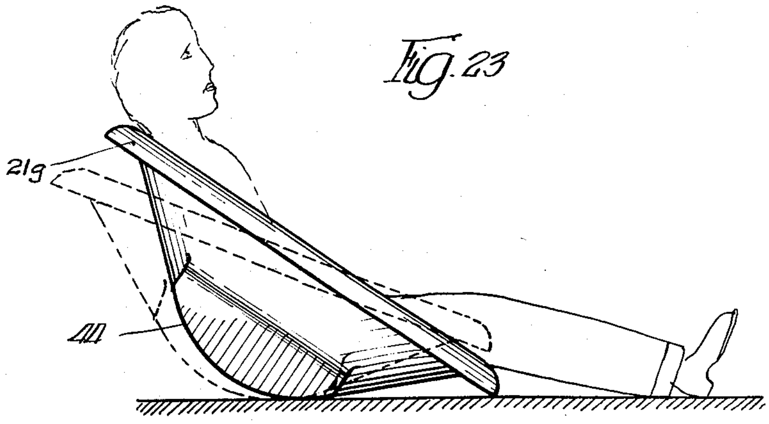

Figure 23 is a side elevational view showing a modified form of seat unit removed from the base structure for use directly on the floor.

Figure 25:
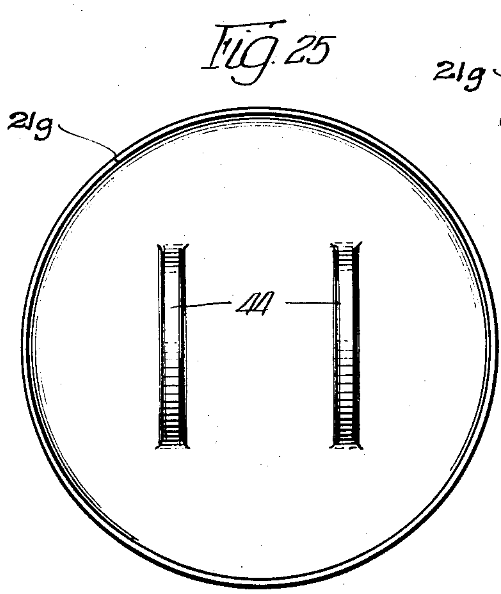
Figure 24:
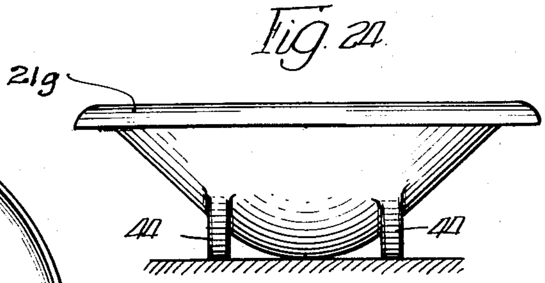

Figure 24 is a front elevational view of this modified seat unit, showing the rockers formed thereon; and Figure 25 is a bottom elevational view of the seat unit, showing the parallel rockers.

Referring first to the round chair embodiment of the invention illustrated in Figures 1 to 10, inclusive, this embodiment comprises a circular form of depressed pocket or conical chair seat 21 having a rounded undersurface. Extending outwardly from the upper edge of this pocket or chair seat 21 is a continuous circular rim 22 formed with a cupped undersurface 23 and with a downwardly curved outer lip 24. The pocket 21 and continuous rim 22 are shown as being formed integral with each other, being preferably composed of a rigid moldable material, such as a suitable plastic, fiber glass or the like. This pocket or chair bottom 21 is of a size which will comfortably receive the back, hips and thighs of an average or large size adult.

Supporting the depressed pocket or chair bottom 21 is the aforementioned multiple tilt base structure 25. In the circular chair embodiment shown in Figures 1 to 10, inclusive, this base structure comprises a top circular ring 26 composed of pipe, metallic tubing, rattan or other suitable material. The cupped undersurface 23 of the circular rim 22 fits down over this top circular ring 26. In embodiments in which the depressed pocket 21 is composed of canvas or other suitable fabric, the upper edge of the convas pocket would be laced or sewed around the top circular ring 26.

Extending downwardly from the top circular ring 26 are a plurality of vertical legs 27 also composed of pipe or metallic tubing, there preferably being three or more of these vertical legs in the round chair embodiment of the invention. The vertical legs 27 may be welded or otherwise secured to the top circular ring 26. In the preferred construction of the base structure, these vertical legs 27 are all of the same length.

Welded to and extending inwardly from the lower ends of the vertical legs 27 are radially extending struts 28 also composed of pipe or metallic tubing. In the four position embodiment of the chair these struts are separately designated 28a, 28b, 28c and 28d. The inner ends of these radial struts are all welded or otherwise joined together at a centrally located apex 30. The radial struts are all of the same length, which length exceeds the radial dimension between diametrically opposite vertical legs 27, whereby the central apex 30 is displaced downwardly below the transverse plane of the lower ends of the vertical legs 27. That is to say, the radial struts 28 form the four corners or sides of a very obtuse inverted pyramid, with the junction point 30 of the struts constituting the apex of the pyramid. Each pair of radial struts defines the two sides of an outwardly and upwardly sloping quadrant or triangle. Extending across the outer base ends of these quadrants or triangles are arcuate or angular supporting members 32a, 32b, 32c and 32d. These arcuate supporting members may consist of separate sections of pipe or tubing having their ends welded to the junctions of the vertical legs 27 and struts 28; or they may consist of integral sections of a continuous ring welded to the legs and struts and appropriately bent therebetween. These arcuate supporting sections 32a, 32b, etc. form the outer points of support of four different supporting areas or flats designated A, B, C, and D. Each of these supporting areas or flats A, B, etc. is of triangular outline, consisting of the apex 30 at its inner end and one of the supporting sections 32a, 32b, etc. at its outer edge. The arcuate supporting section 32a associated with supporting surface A extends in a plane which is in outward prolongation of the plane of the two radial struts 28a and 28b. Hence, when the chair is tilted to rest on supporting surface A, with the arcuate supporting section 32a in contact with the floor, it is at its most normal or most upright angle of inclination, as shown by the dotted line *w—w* in Figures 3 and 4.

Figure 1:
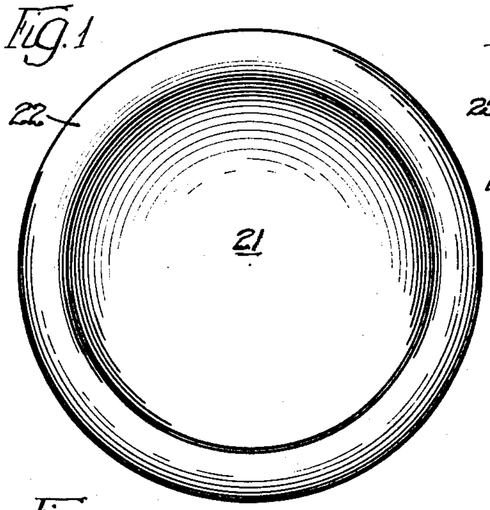
Figure 1 is a top plan view of a chair embodiment of the invention.
Figure 2:
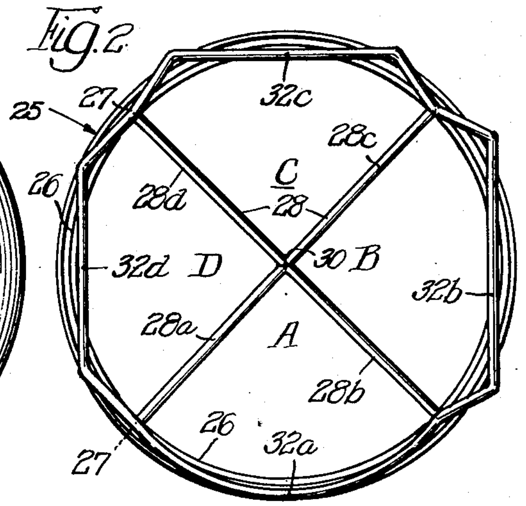
Figure 2 is a bottom plan view of this chair embodiment.
Figure 3:
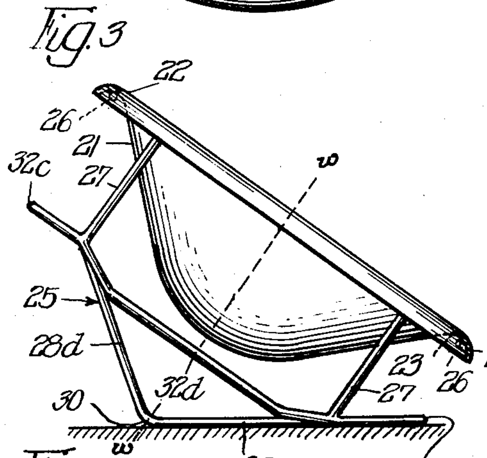
Figure 3 is a side view of the chair tilted to one angle.
Figure 4:
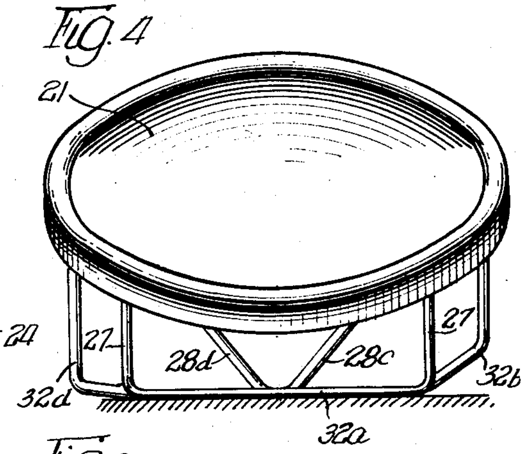
Figure 4 is a front view at right angles thereto, illustrating the open front of the chair seat when tilted to this angle.
Figure 5:
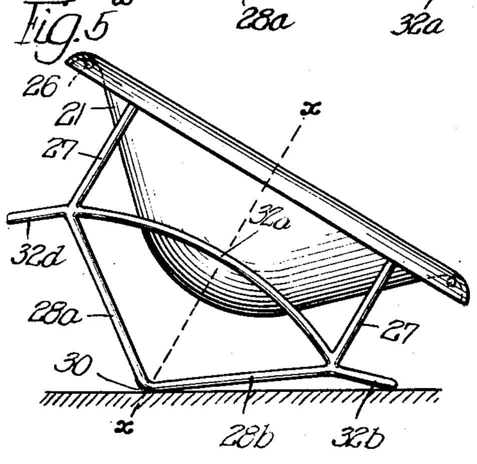
Figures 5 and 6 are views similar to Figures 3 and 4, showing the chair tilted to a second angle of repose.
Figure 6:
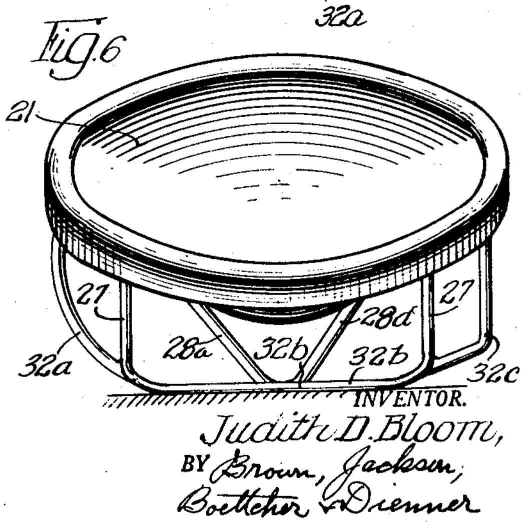

Referring now to Figures 5 and 6, the arcuate supporting section 32b constituting the outer part of supporting area B, extends from the radial strut 28b to the next adjoining radial strut 28c. The intervening span of this second arcuate supporting section 32b is bent downwardly to lie slightly below the plane of its two radial struts 28b and 28c, so that the chair will be inclined or tipped rearwardly at a greater angle when resting in this B position on supporting area B than when the chair is in its A position; as indicated by the dotted line *x—x* in Figures 5 and 6.

Figure 7:
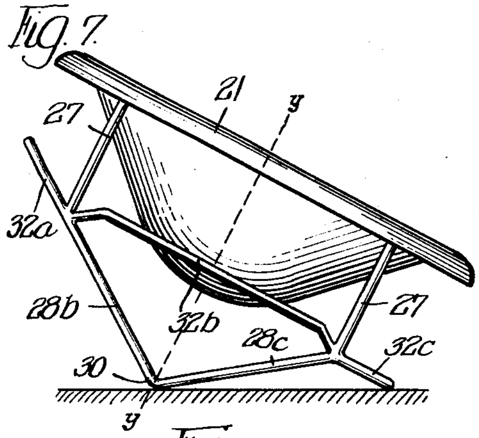
Figures 7 and 8 are views similar to Figures 3 and 4 showing the chair tilted to a third angle of repose.
Figure 8:
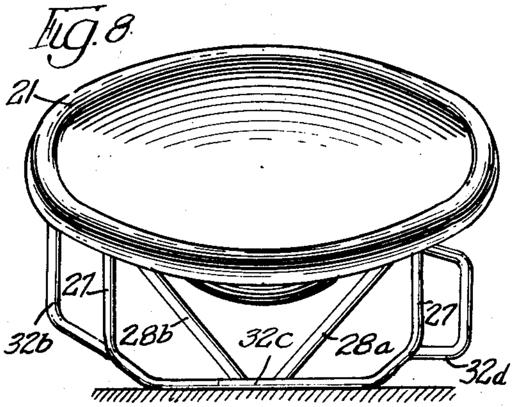

Referring now to Figures 7 and 8, the third arcuate supporting section 32c constituting the outer part of supporting area C, extends between the struts 28c and 28d. The intervening span of this third supporting section 32c is bent to project down still further below the plane of its radial struts 28c, 28d than does the second supporting section 32b. Hence, as shown in Figures 7 and 8, when the chair is in this C position it is inclined rearwardly at a still greater angle *y—y* than when it is in its B position.

Figure 9:
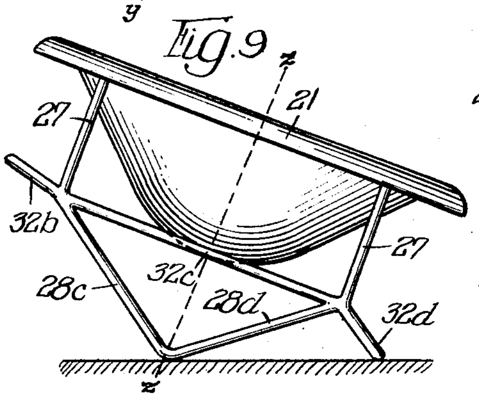
Figures 9 and 10 are views similar to Figures 3 and 4 showing the chair tilted to a fourth angle of repose.
Figure 10:
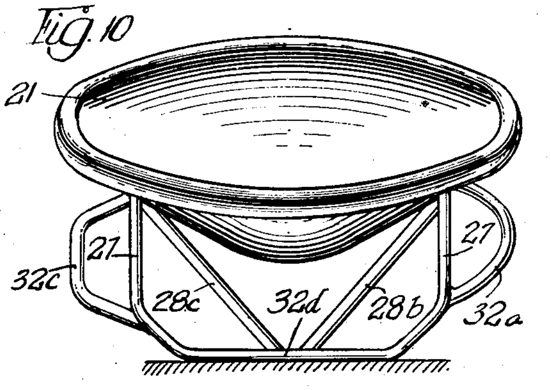

Referring now to Figures 9 and 10, the fourth arcuate supporting section 32d constituting the outer part of supporting area D, extends between radial struts 28d and 28a, and has its intervening span bent down still further below the plane of these radial struts. Hence, as shown in Figures 9 and 10, when the chair is in this D position it is tipped rearwardly at a still greater angle *z—z* than when it is in its C position.

Figure 11:
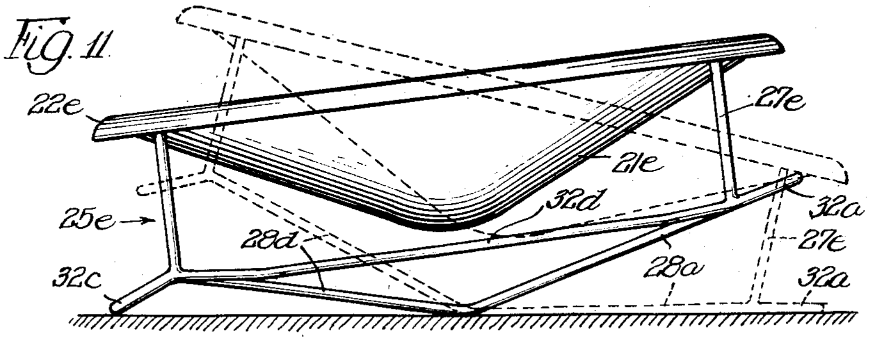
Figure 11 is a side view of a modified embodiment combining the features of a chair and chaise lounge.
Figure 12:
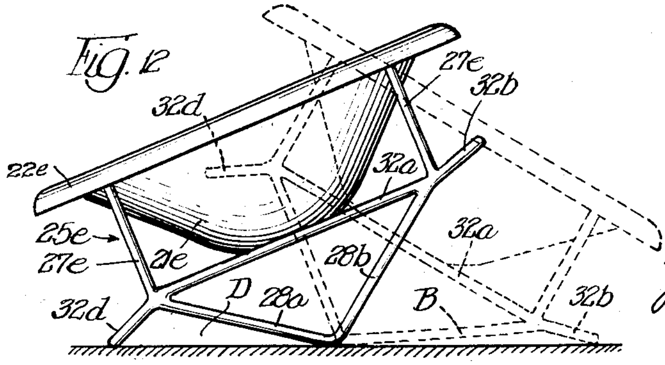
Figure 12 is an end view of such latter embodiment.
Figure 13:
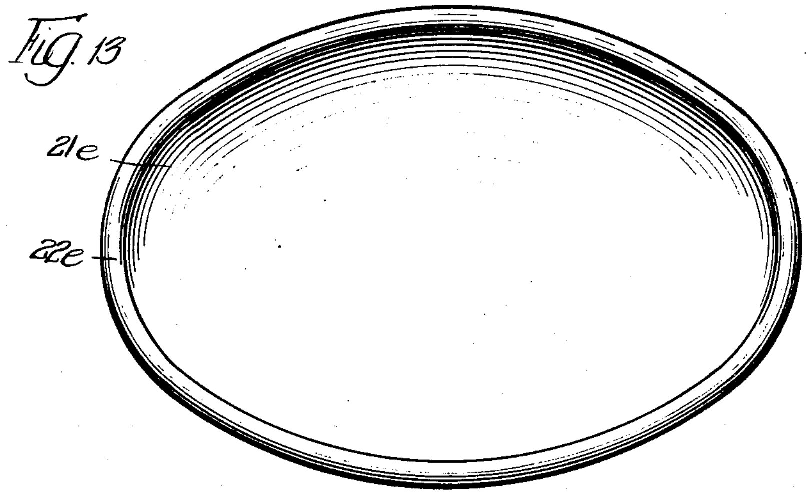
Figure 13 is a top plan view thereof.

In Figures 11–13, I have shown a modified embodiment of my invention which combines a chair and a chaise lounge into a multiple tilt device. In this modified embodiment, the depressed pocket 21e, the continuous rim 22e and the base structure 25e are all elongated into oval formation. The long dimension of the oval functions as a chaise lounge, while the short dimension of the oval still functions as a chair. The long dimension or major axis of the chaise lounge formation rests alternately on either the supporting surface at one end of the long oval, or ellipse, or on the opposite supporting surface at the other end of the long oval or ellipse. The supporting section 32a of supporting surface A extends in prolongation of the plane of radial struts 28a, 28b, or substantially so, so that when the long oval of the chaise lounge formation is resting on supporting surface A, the depressed pocket is at a relatively sharp angle of inclination. Conversely, when the long oval of the chaise lounge formation is resting on the supporting surface C the chaise lounge is disposed at a substantially smaller angle, because of the downward depression of arcuate supporting section 32c below the plane of radial struts 28c, 28d.

With regard to the short dimensions or minor axis of the oval or ellipse, representing the chair, this can rest alternately on either the supporting surface B or D, as shown in Figure 12. The supporting section 32b of supporting surface B may be bent downwardly at a slight angle to the plane of radial struts 28b, 28c, so that when the chair is resting on supporting surface B it is tilted upwardly at the angle shown in dotted lines in Figure 12, corresponding approximately to the chair angle shown in Figure 5. Conversely, the supporting section 32d of supporting surface D may be bent downwardly at a sharper angle below the plane of its radial struts 28a, 28d so that when the chair is resting on supporting surface D it is tipped at the angle shown in full lines in Figure 12, corresponding approximately to the chair angle shown in Figure 9. It will be understood that these angles are merely exemplary and may be varied considerably for the four different sides of the device.

Figure 14:
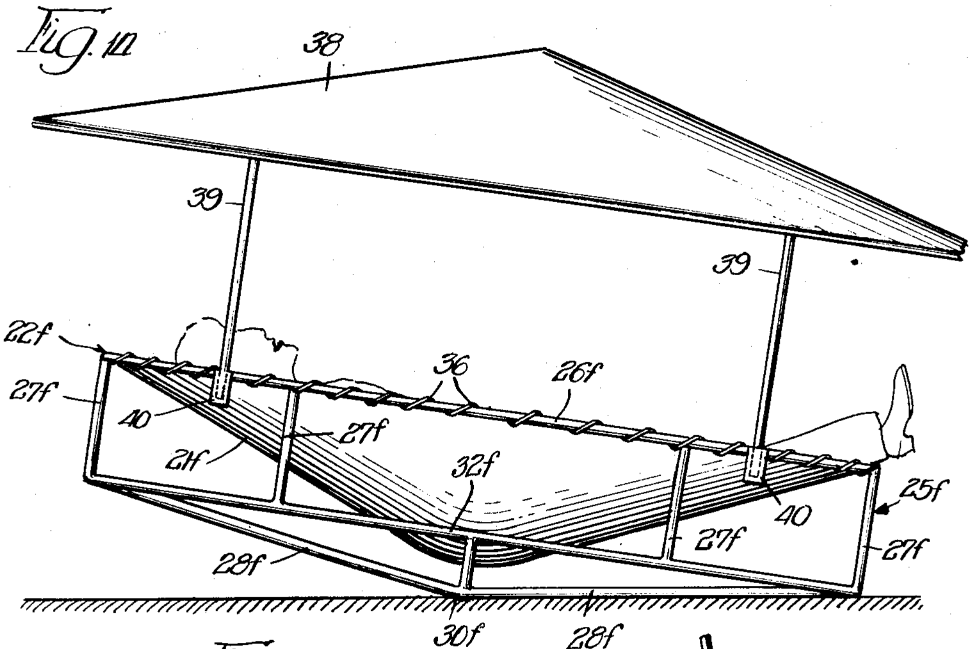
Figures 14 and 15 are fragmentary side elevational views of a modified embodiment of the invention constructed in the form of a hammock for use on a lawn, porch, or other appropriate location.
Figure 15:
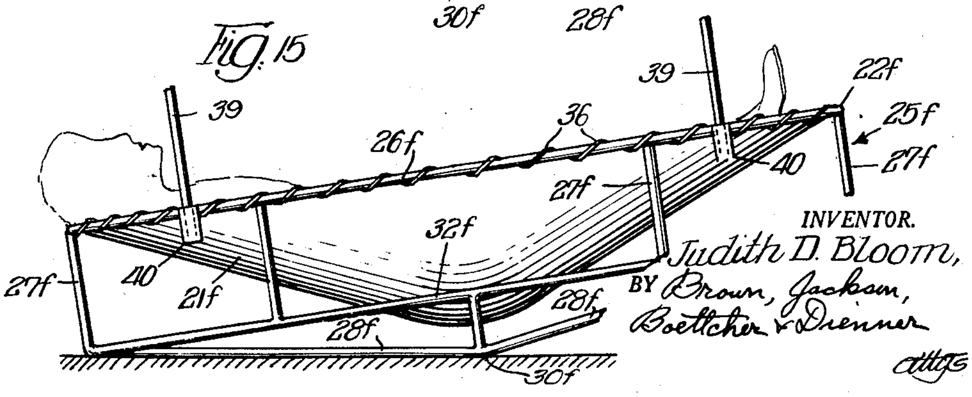

In Figures 14 and 15 inclusive, I have shown a lawn or porch hammock embodying several features of the preceding embodiments. The depressed pocket 21f is shown as being composed of canvas, having its circular margin laced or sewed to the top circular ring 26f of the supporting base 25f, such as by the lacing 36. The top circular ring 26f and the laced edge of the canvas form a continuous rim 22f around the entire circular contour of the hammock. In lieu of canvas, the pocket 21f may be formed of plastic, fiber glass or the like. In the larger size of base structure required of the hammock, there are six or eight vertical legs 27f, all terminating at their lower ends in a lower circular ring 32f. Extending inwardly from this lower ring 32f are a plurality of radial struts 28f, preferably four in number. These radial struts terminate in a centrally located apex 30f which lies in a plane displaced downwardly below the plane of the lower circular ring 32f. Thus, the hammock can be tilted in four different directions around this apex 30f, being brought to rest in any of these four positions on two of the radial struts 28f and the intervening segment of the lower circular tube 32f. The hammock is preferably so constructed, substantially in the proportions illustrated, that the occupant of the hammock, by merely shifting his body weight lengthwise within the depressed pocket 21f, can tilt the hammock from the head raised position shown in Figure 14 into the head lowered position shown in Figure 15, or vice versa.

If desired, this hammock embodiment of the invention may be provided with a canopy or awning type of sun shade 38 mounted on the hammock by upwardly extending supporting rods 39. The lower ends of these rods are removably mounted in sockets 40 carried by the base structure 25f, whereby the canopy can be readily removed whenever desired. The canopy or sun shade may be composed of fabric or any other suitable material supported on a circular frame.

In Figures 16 to 20, inclusive, I have shown my invention constructed entirely of a moldable plastic material, such as a suitable plastic, fiber glass or the like. The chair embodiment is shown as being molded in the form of a seat unit 21g, and a separate base or supporting unit 25g, although the seat and base unit might be molded in the form of one piece. The seat unit 21g is preferably substantially identical with the seat unit 21 of Figures 1 to 10, inclusive, being formed with the previously described rim 22g having the cupped undersurface 23g and downwardly curved outer lip 24g. The base structure 25g is molded as an open top hollow cylindrical unit comprising a cylindrical outer wall 27g which terminates in a rounded upper edge 26g that fits into the concave undersurface 23g of the rim 22g. The lower portion of this cylindrical base structure is formed with a closed bottom, in which bottom are molded a plurality of flat seating surfaces inclined at various angles. As illustrative of one preferred adaptation, I have shown the same general arrangement of triangular seating surfaces A, B, C and D previously described (see Figure 20), although it will be understood that the particular number of seating surfaces may be increased or decreased, if desired. Figures 16, 17, 18 and 19 show approximately the different angles of repose of the chair when resting on seating surfaces A, B, C and D respectively.

In Figures 21 and 22 I have shown a modified embodiment of a chair which will permit of sidewise rocking motion in one of the titled positions of the chair. This sidewise rocking motion is shown as being accommodated when the chair is tilted into a particular one of its positions, such as position C, this sidewise rocking motion being permitted by forming the outer supporting section for position C in the form of a circular arc, as indicated at 32c′ in Figure 22. In each of the other tilted positions the chair remains in fixed lateral stability. This sidewise rocking feature can also be embodied in the plastic base construction of Figures 16–20.

In Figures 21 and 22 I have shown the depressed pocket 21 as being lined with foam rubber or like resilient material, indicated at 42. This foam rubber lining is preferably adhesively bonded or vulcanized to the depressed pocket 21. It will be understood that this foam rubber lining can be provided in the depressed pockets of any embodiments herein described.

The depressed pocket or seat unit 21 or 21g can be removed from the base structure 25 or 25g and placed directly on the floor for fireside use, television viewing or the like, as shown in Figure 23. In order to give the seat unit lateral stability in such use, while still permitting rocking or tilting movement to or fro, the bottom surface of the seat unit is formed with laterally spaced rockers 44 projecting downwardly therefrom. These rockers are preferably molded integrally with the seat unit, and extend downwardly to the level of the rounded bottom of the seat unit. The rockers may be parallel, or may converge toward a rear point. Figure 23 illustrates in dotted lines the action of these rockers, in either permitting the occupant to tilt the seat unit back to a different fixed angle, or to rock in a to and fro rocking motion. The presence of these rockers 44 does not interfere with the reception of the seat unit either in the tubular form of base structure 25 or in the one-piece plastic base structure 25g.

The parts of my invention which are described as being made of plastic, fiber glass or the like can conveniently be made of moldable plastics typically represented by phenolics, ureas, melamines and the like, which may reenforced or laminated with glass fiber ("Fiberglas") or other strengthening materials.

While I have illustrated and described what I regard to be the preferred embodiments of my invention, nevertheless it will be understood that such are merely exemplary and that numerous modifications and rearrangements may be made therein without departing from the essence of the invention.

I claim:

1. A multiple tilt chair, chaise lounge or hammock comprising a conically shaped pocket having an upper continuous rim enabling the body to be placed in said pocket at different angles with the feet extending outwardly from any one of a plurality of different points around said continuous rim, and a multiple tilt base structure for said pocket comprising a substantially centrally located apex and a plurality of triangularly shaped supporting surfaces radiating outwardly at different angles from said apex.

2. A multiple angle tiltable support to be used as a chair, chaise lounge or the like, comprising a conically shaped pocket for receiving the body of the user, and a multiple angle base affording a plurality of rigid triangularly shaped supporting surfaces, each of which forms a differently inclined stable support for the chair, chaise lounge or the like.

3. A multiple angle tiltable support to be used as a chair, chaise lounge or the like, comprising a conically shaped pocket for receiving the body of the user and a multiple angle base for said pocket provided with a rigid apex located substantially centrally of said bottom and having rigid resting surfaces radiating outwardly from said rigid apex at different angles whereby the support may be tilted to rest on any one of said outwardly radiating surfaces.

4. In a device of the class described, the combination of a generally circular base structure, a conically shaped pocket supported in the upper portion of said base structure for receiving the body of the occupant, and a bottom on said base structure in the form of an inverted pyramid comprising a downwardly projecting rigid apex, and a plurality of triangularly shaped supporting areas radiating outwardly from said apex and each forming a differently inclined stable supporting surface for said device.

5. In a device of the class described, the combination of a generally circular base structure, a conically shaped pocket supported in the upper portion of said base structure for receiving the body of the occupant, and a bottom on said base structure comprising a downwardly projecting rigid apex, and a plurality of rigid triangularly shaped supporting areas at angularly spaced points around said apex adapted to be used selectively for affording differently inclined stable rigid supporting surfaces for said device.

6. In a device of the class described, the combination of a seat unit of generally circular outline formed with a depressed conical pocket and a downwardly cupped outer rim, a base structure of generally circular outline having its upper edge fitting into the cupped outer rim of said seat unit, and a multiple positioned bottom on said base structure comprising a downwardly projecting apex and a plurality of selectively usable supporting areas radiating outwardly from said apex.

7. In a device of the class described, the combination of a seat unit of generally circular outline formed with a depressed conical pocket and a downwardly cupped outer rim, a base structure comprising an upper ring fitting into the cupped outer rim of said seat unit, supporting rods extending downwardly from said upper ring, struts extending substantially radially inwardly from the lower ends of said supporting rods to an apex located below the plane of the lower ends of said supporting rods, and supporting members extending between the outer ends of adjacent pairs of said struts, one of said supporting members being bent downwardly to lie below the plane of its respective pair of struts.

8. In a device of the class described, the combination of a seat unit constructed of moldable plastic of generally circular outline formed with a depressed conical pocket and a downwardly cupped outer rim, a base structure constructed of metallic tubing comprising an upper ring fitting into the cupped outer rim of said seat unit, tubular supporting rods extending downwardly from said upper ring, tubular struts extending radially inwardly from the lower ends of said supporting rods to an apex located below the plane of the lower ends of said supporting rods, and tubular supporting members extending between the outer ends of adjacent pairs of struts, one of said tubular supporting members lying in the plane of its respective pair of struts, and another of said tubular supporting members being bent downwardly to lie below the plane of its respective pair of struts.

9. In a combination chair and chaise lounge, the combination of a base structure, a depressed pocket in the upper portion of said base structure of oval or elliptical outline, the minor axis of said elliptical pocket serving as a chair and the major axis of said pocket serving as a chaise lounge, supporting surfaces of different inclination at the opposite ends of said base structure for supporting said pocket at different angles when serving as a chaise lounge, and supporting surfaces of different inclination at the opposite sides of said base structure for supporting said pocket at different angles when serving as a chair.

10. In a hammock of the class described, the combination of a base structure, a conical pocket composed of fabric and secured within the upper portion of said base structure, said base structure comprising a downwardly projecting rigid apex substantially at its center and a plurality of triangularly shaped supporting areas at angularly spaced points around said apex adapted to be used selectively for the support of said hammock.

11. In a hammock of the class described, the combination of a base structure of substantially circular outline, a conical supporting pocket composed of fabric laced to the upper rim of said base structure, a multiple position bottom on said base structure, comprising a downwardly projecting apex and a plurality of angularly spaced supporting areas radiating outwardly from said apex, and a canopy supported above said pocket.

12. In a device of the class described, the combination of a substantially conical seating pocket, a base structure for said seating pocket, a downwardly projecting apex substantially in the center of the bottom of said base structure, and a plurality of triangularly shaped supporting surfaces radiating outwardly from said apex, one of said supporting surfaces comprising a transverse rocking surface to permit sidewise rocking of said chair when resting on said latter supporting surface.

References Cited in the file of this patent

UNITED STATES PATENTS

| | | |
|---|---|---|
| D. 168,843 | Johnson | Feb. 17, 1953 |
| D. 171,265 | Phillips | Jan. 5, 1954 |
| 729,619 | Luensmann | June 2, 1903 |
| 1,712,703 | Hudson | May 14, 1929 |
| 2,417,618 | Scott | Mar. 18, 1947 |
| 2,482,306 | Waldheim | Sept. 20, 1949 |
| 2,588,029 | Morris | Mar. 4, 1952 |
| 2,615,495 | Hilliker | Oct. 28, 1952 |
| 2,762,423 | Thomas | Sept. 11, 1956 |
| 2,785,733 | Witty | Mar. 19, 1957 |